Figure 1:
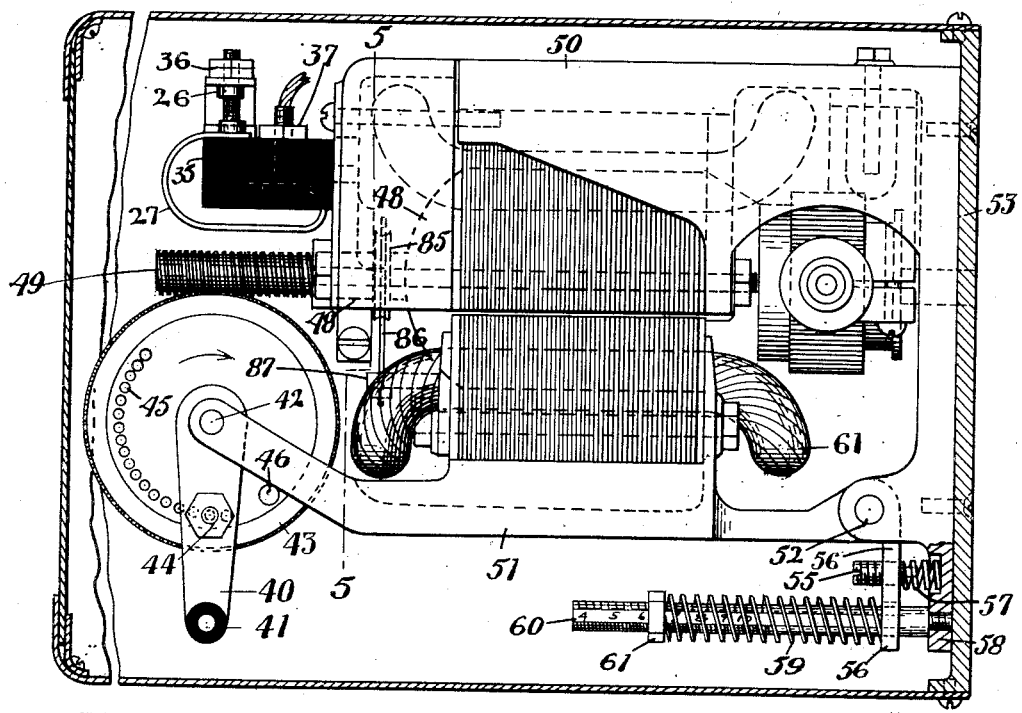

G. A. BURNHAM.
SELECTIVE TIME LIMIT CONTROLLING DEVICE FOR ELECTRIC SWITCHES.
APPLICATION FILED JULY 17, 1911.

1,041,716.

Patented Oct. 15, 1912.

6 SHEETS—SHEET 1.

Witnesses
H. B. Davis
J. L. O'Neill

Inventor
George A. Burnham
by Nuyes & Harriman
Attys

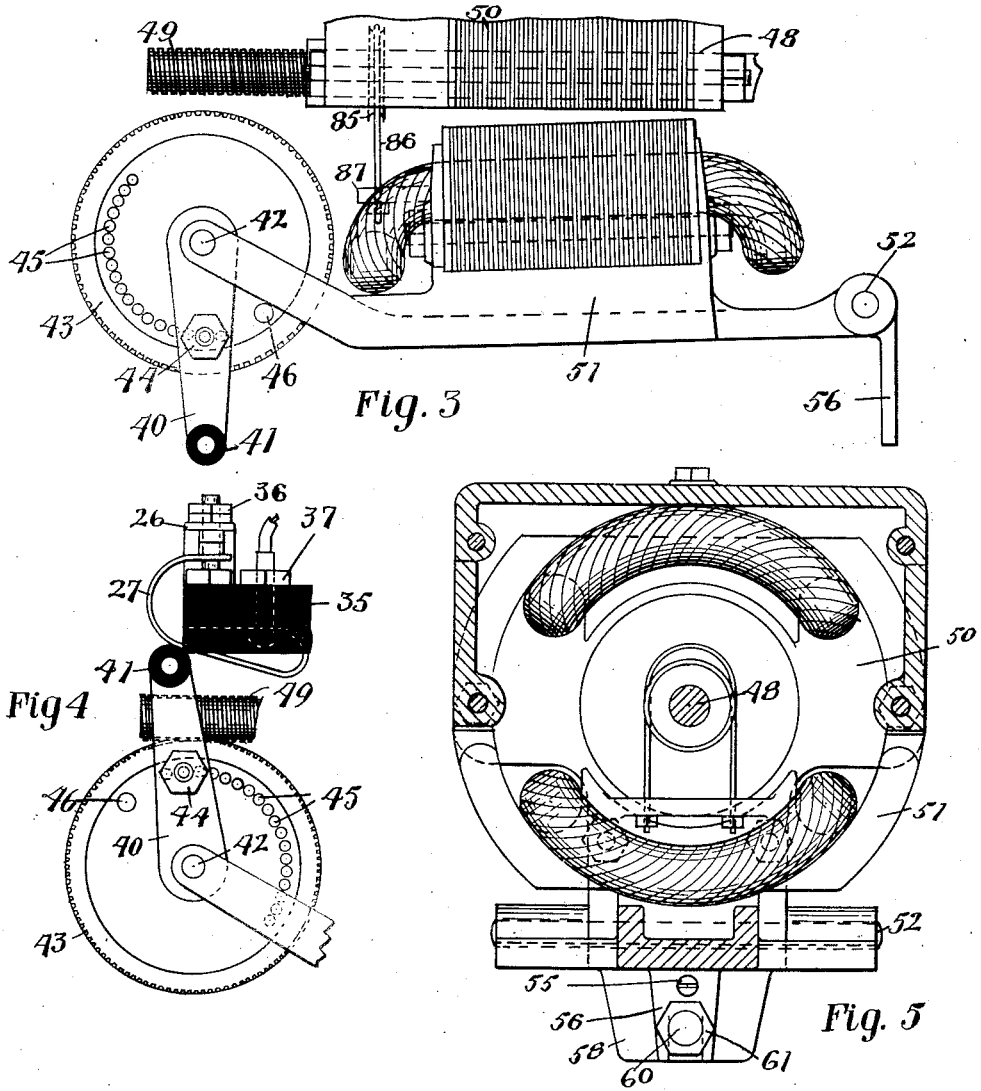

G. A. BURNHAM.
SELECTIVE TIME LIMIT CONTROLLING DEVICE FOR ELECTRIC SWITCHES.
APPLICATION FILED JULY 17, 1911.
1,041,716.
Patented Oct. 15, 1912.
6 SHEETS—SHEET 3.
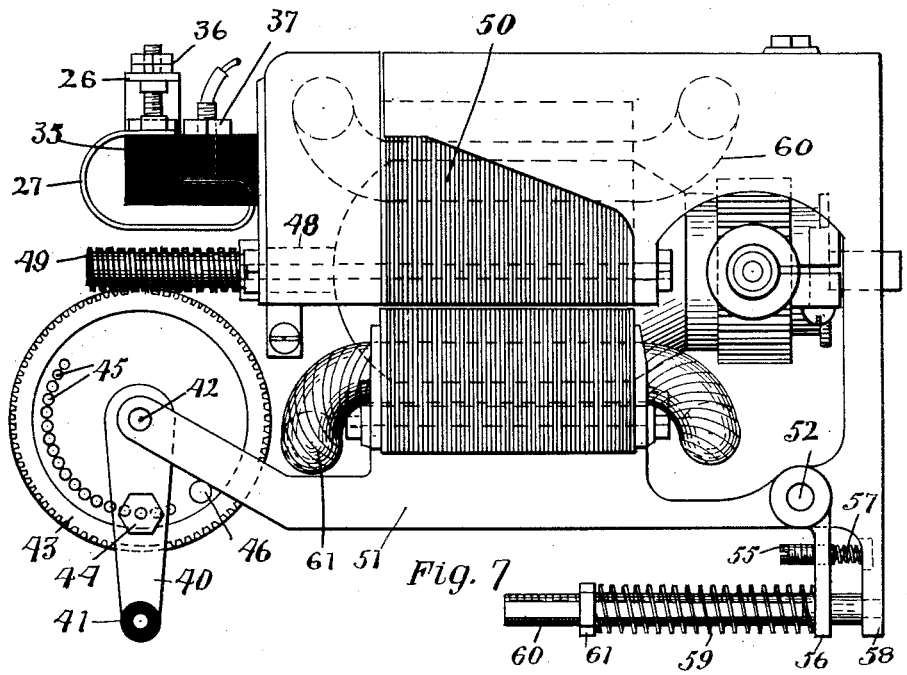
Fig. 7
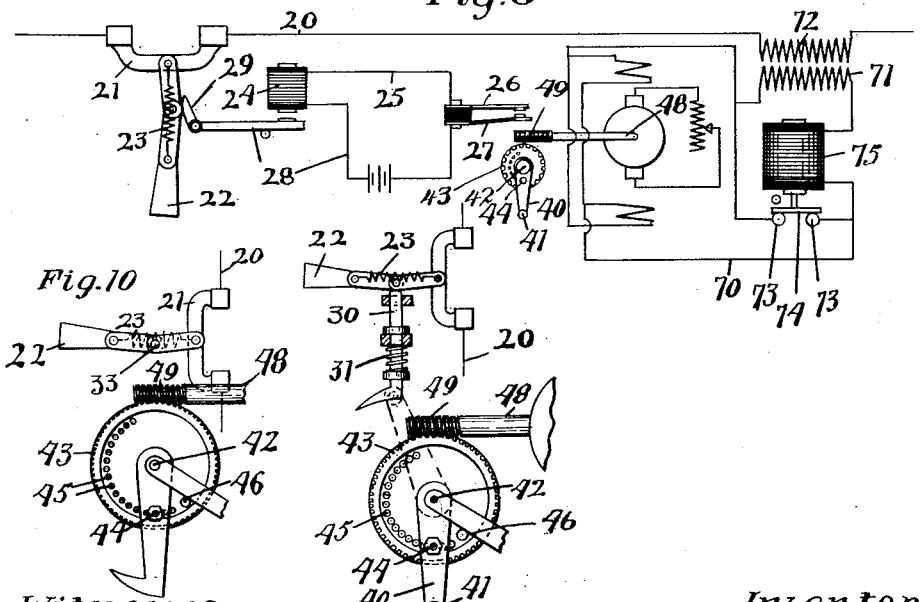
Fig. 8
Fig. 10
Fig. 9
Witnesses;
H. B. Davis.
J. L. O'Neill
Inventor;
George A. Burnham
by Mayer & Harriman
Attys.

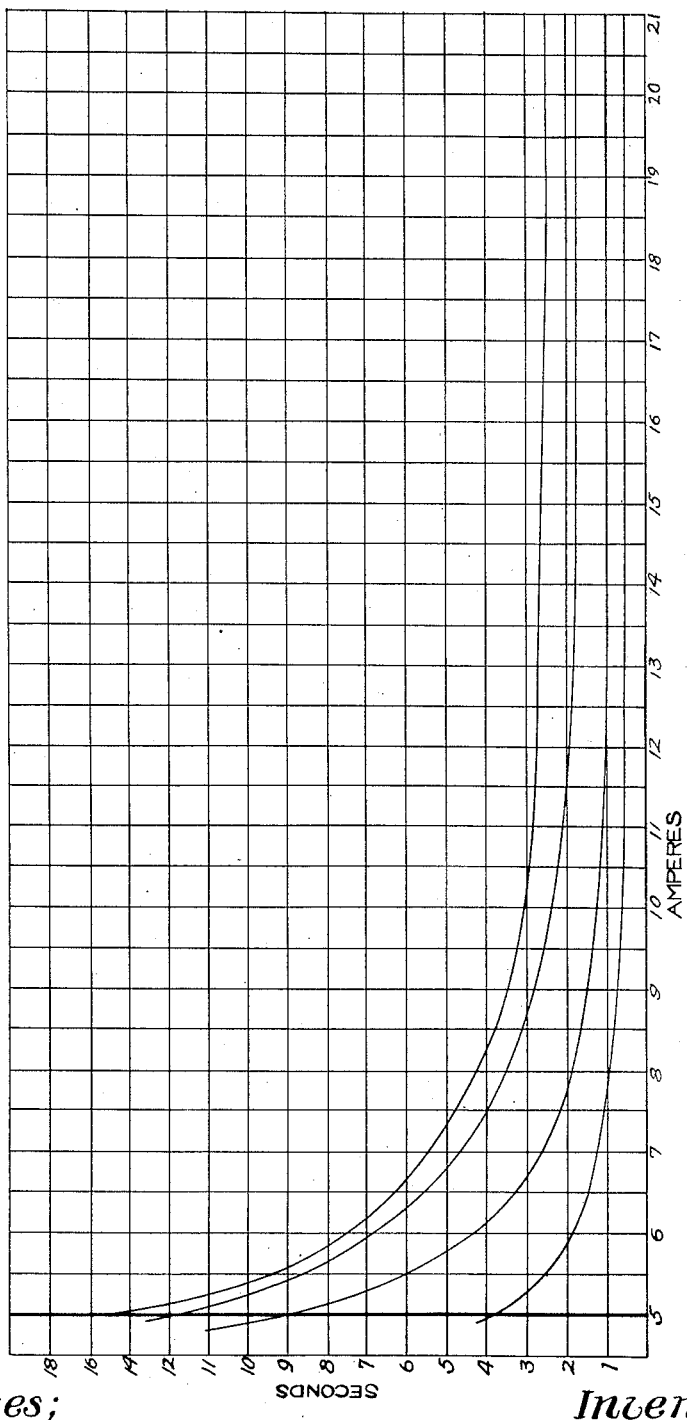

G. A. BURNHAM.
SELECTIVE TIME LIMIT CONTROLLING DEVICE FOR ELECTRIC SWITCHES.
APPLICATION FILED JULY 17, 1911.

1,041,716.

Patented Oct. 15, 1912.

6 SHEETS—SHEET 5.

Witnesses
H. B. Davis.
J. L. O'neill

Inventor
George A. Burnham.
By Hayes & Harriman
atty.

G. A. BURNHAM.
SELECTIVE TIME LIMIT CONTROLLING DEVICE FOR ELECTRIC SWITCHES.
APPLICATION FILED JULY 17, 1911.

1,041,716.

Patented Oct. 15, 1912.

6 SHEETS—SHEET 6.

Witnesses
H. B. Davis.
J. L. O'neill

Inventor
George A. Burnham.
By Hayes & Harrison
Attys.

UNITED STATES PATENT OFFICE.

GEORGE A. BURNHAM, OF SAUGUS, MASSACHUSETTS, ASSIGNOR TO S. B. CONDIT, JR., OF BOSTON, MASSACHUSETTS.

SELECTIVE TIME-LIMIT-CONTROLLING DEVICE FOR ELECTRIC SWITCHES.

1,041,716. Specification of Letters Patent. Patented Oct. 15, 1912.

Application filed July 17, 1911. Serial No. 638,846.

*To all whom it may concern:*

Be it known that I, GEORGE A. BURNHAM, a citizen of the United States, residing at Saugus, in the county of Essex and State of Massachusetts, have invented an Improvement in Selective Time-Limit-Controlling Devices for Electric Switches, of which the following is a specification.

This invention relates to time-limit controlling-devices for electric-switches. Heretofore time-limit controlling-devices for electric-switches have been devised requiring a prolonged period of time to operate the switch, the speed of which was constant regardless of the strength of the overload; also time-limit controlling-devices have been devised requiring a prolonged period of time to operate the switch, the speed of which was variable, depending upon the strength of the overload. In the first-named instance, in case an overload greatly exceeds the normal setting of the controlling-device said device will not operate quickly enough to protect the apparatus; and in the last named instance, in case the overload is excessive the controlling-device will operate almost instantly, regardless of its setting. In case several controlling-devices of the last named type are connected in a circuit and arranged with different settings, so as to operate selectively on a given overload, they will all operate almost instantly and practically simultaneously upon an excessive overload, hence they will not be selective, and as a result some of the circuits will be opened unnecessarily, which is very objectionable.

One of the objects of this invention is the construction of a time-limit controlling-device for electric-switches adapted to be operated by an overload current, and when used in connection with other like controlling-devices, all will be selective, regardless of the strength of the overload, the object being particularly to produce a device which will be selective on a heavy overload, as for instance, an overload in excess of approximately three times the full load of the circuit which is controlled by the switch.

The time-limit controlling-device embodying this invention comprises a movable element to control the operating-means for the switch, a coil for said movable element having its magnetic-circuit and windings so proportioned that upon the occurrence of a light overload, as for instance an overload less than three times the full load of the circuit controlled by the switch, or thereabout, the force which is exerted by the movable element is variable according to the strength of the overload, or, in other words, is proportionate to the overload, and upon the occurrence of a heavy overload, as for instance an overload which is three or more times the full load of the circuit, the force which is exerted by the movable element is constant regardless of the strength of the overload. The operating-means for the switch is constructed and arranged to require a prolonged period of time to operate the switch, and means are provided for adjusting said operating-means whereby said period of time may be varied so that the device may be used in connection with other like devices, and all of the devices adjusted differently. For a light overload the devices can be made to operate selectively by an adjustment of the operating-means. In such case the movable elements of all the devices will be operated at a speed corresponding or proportionate to the strength or current value of the overload, and by reason of the different adjustments, will cause the operating-means which is set to operate on the shortest period of time to operate the switch at the end of such period of time. Such period of time, however, is variable according to the strength or current value of the overload. For a heavy overload adjustment of the operating-means alone is not sufficient to enable the devices to operate selectively, but by constructing and arranging the movable element and coil in accordance with this invention, said movable element will be operated at its maximum speed or caused to exert its maximum force during such prolonged period of time and until the switch is operated, which speed or force, however, is constant, regardless of the strength or current value of the overload.

The invention also involves means, such for instance as an electric-motor, which is responsive to an overload current, for moving the switch operating-device at a variable speed according to the strength of the overload current up to the point of saturation, hereinafter referred to and at a definite or constant speed on overloads of higher current values.

It also involves means controlled by the overload current for moving the operating-device into engagement with its actuator, which permits movement thereof out of engagement when the overload ceases, said means also driving said actuator; and in so far as this feature is concerned, the invention also involves an electric-motor which may or may not have the characteristics above set forth, which is constructed and arranged to rotate the actuator for the switch operating-device, and also to effect engagement of said switch-operating-device with its actuator and permit disengagement therefrom.

It also involves means for retarding the speed of movement of the motor whereby it may be more effectively controlled during the prolonged period of time which it consumes in operating the switch.

It also involves means connected with the motor for controlling the starting thereof, whereby it will be held at rest on an overload current of lesser value than that which is designed to start and operate it, such provision enabling the usual overload relay which controls the transformer-circuit to be omitted.

Figure 2:
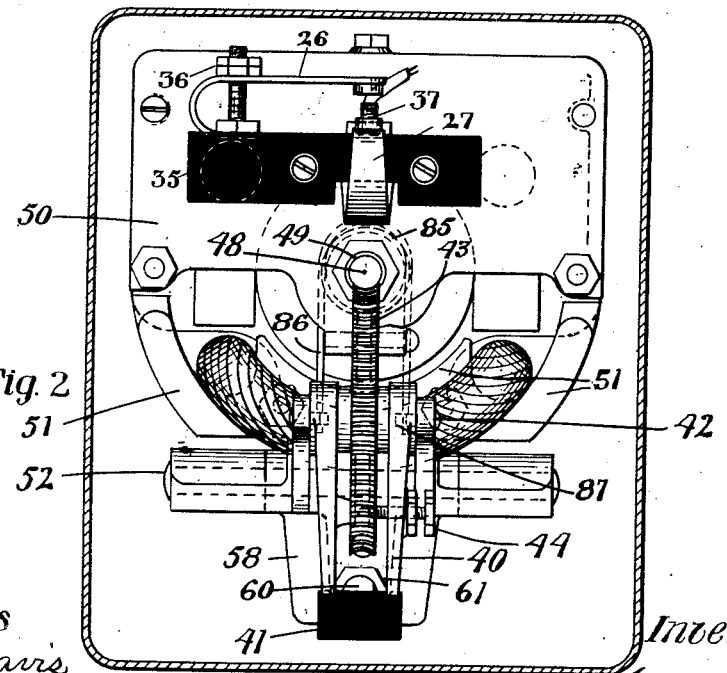
Figure 12:
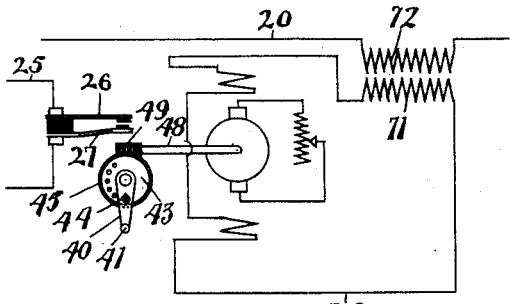

Figure 1 is a side elevation of a time-limit controlling-device for electric-switches embodying this invention. Fig. 2 is a left-hand end elevation of the same. Fig. 3 is a detail of the operating-device and its actuator, the parts being disengaged, and in their normal positions. Fig. 4 is a detail of the operating-device and actuator, the parts being in engagement. Fig. 5 is a vertical section of the device shown in Fig. 1, taken on the dotted line 5—5. Fig. 6 is a detail of electric means for retarding the speed of the motor. Fig. 7 is another modification to be referred to. Fig. 8 is a diagrammatical view of the circuits which may be employed in connection with the time-limit controlling-device, to illustrate the operation of the same. Fig. 9 is a detail view illustrating particularly a modified form of operating-means for the switch. Fig. 10 is a detail view illustrating particularly the switch adapted to be operated directly by the timed operating-device. Fig. 11 is a view of a chart, illustrating by chart lines the operation of the time-limit controlling-device. Fig. 12 is a diagram of a transformer circuit and time-limit controlling-device for the switch, wherein the overload relay is omitted. Figs. 13 to 18 inclusive are modified forms of means responsive to an overload current to actuate the operating means for the switch.

Referring to Fig. 8, wherein a single line-circuit is shown, as a simple manner of illustrating my invention, 20 represents a circuit or line-wire, and 21 a switch included therein, which may be of any suitable construction, but preferably of a type adapted to be operated automatically to open the circuit and manually to close the circuit. A snap-switch of usual construction is here shown, having a hand-lever 22 and an actuating-spring 23. This is the switch which the time-limit controlling-device, forming the subject-matter of this application, is designed to operate automatically, for the purpose of opening the circuit 20. The time-limit controlling-device includes operating-means for the switch and means responsive to an overload current to operate said means or to control its operation. Said switch operating-means may comprise a timed operating-device and a switch-controller which is adapted to be operated by the timed operating-device, although the switch may be operated directly by said timed operating-device. A switch-controller such as may be employed is represented in Fig. 8, which consists of an electro-magnet 24, connected in a battery-circuit 25, controlled by the circuit-closing members 26, 27; and the armature of said magnet is connected to a lever 28, secured to a pivot-shaft, to which shaft is secured a short arm 29, designed to engage and operate the snap-switch to open the circuit 20 upon energization of the magnet. The circuit-closing members 26, 27, are normally open, and are adapted to be closed by the timed operating-device to close the circuit 25, to operate the switch 21 automatically. This form of electrical switch-controller is here shown merely for the purpose of illustrating one practical form which may be employed. In lieu thereof a mechanical switch-controller may be employed, such for instance as shown in Fig. 9, wherein a spring-controlled bar 30, is arranged at the side of the lever-mechanism of the switch 21, which upon a longitudinal sliding movement against the force of its controlling or return-spring 31, acts to move said lever-mechanism to operate the switch and open the circuit 20. Said bar is arranged to move but a short distance in order to operate the lever-mechanism, but during such movement it is constantly under the control of the spring 31, so that when pressure upon it is relieved it will be returned immediately by said spring, regardless of the distance it has moved. By making said bar independent of the switch and providing it with a controlling-spring of its own, it will be automatically returned to normal when pressure upon it is relieved.

In case a mechanical switch-controller, such as shown in Fig. 9 is employed for automatic operation, it is of particular advantage to arrange it in connection with a snap-switch for the reason that its movements are independent of the switch, and in case the overload current should not continue to the last moment required to operate the switch it will be returned to normal automatically, and when said overload current is continued it will cause the switch to operate quickly.

In Fig. 10, the switch 21 is arranged to be operated directly by the timed operating-device, its toggle-lever-mechanism having a pin 33, adapted to be engaged by a member of said device.

Referring to Figs. 1, 2 and 4, wherein the electric switch-controller is shown, the circuit-closing member 26, is made as a resilient bent strip of metal, secured to the top of a block 35, of insulating material, attached to the field-frame of an electric-motor, (although it may be otherwise supported), and the circuit-closing member 27 is made as a resilient bent strip of metal secured to the under side of said block, its free end being extended to a position beneath the free end of the member 26, to permit of its being lifted into engagement with said member 26, to close the circuit 25; and the circuit-wires of said circuit 25 are connected respectively to said members at 36, and 37; although it is obvious said circuit-closing members may be otherwise constructed.

The operating-device for the switch-controller or for the switch, as the case may be, is constructed and arranged to be moved to operate the switch-controller or the switch at the end of a prolonged period of time, hence is time-controlled, and as time-controlled operating-devices for circuit-closers are very old in the electrical art any of the well-known forms may be employed, so far as this invention is concerned; although the particular form here shown involves novel features. As here shown it comprises a yoke or arm 40, arranged to be moved rotarily in a vertical plane, having at its extremity a cross-piece or pin 41, of insulating material, which, when the yoke or arm is moved through an interval of space is adapted to engage the circuit-closing member 27, and move it into engagement with the circuit-closing member 26. Said yoke or arm is mounted loosely on a shaft 42, to which a worm-wheel 43 is secured, and means as a screw 44 is provided for adjustably connecting said yoke or arm with said worm-wheel in different radial positions, said screw entering any one of a series of holes 45, arranged in the side of said worm-wheel, so that the yoke or arm will be moved by said worm-wheel. Said worm-wheel also has a pin 46 projecting from its side which is adapted to engage a stop, here shown as a part of the field-frame of an electric-motor, to thus determine its normal position, or starting point, and said worm-wheel normally occupies this position regardless of the position of the yoke or arm relative thereto. As the worm-wheel is revolved in the direction of the arrow Fig. 1, said yoke or arm is moved by it through a definite interval of space, according to its setting to engage with the under circuit-closing member 27.

Referring to Fig. 9, the sliding bar 30 has its end formed with an inclined portion which is adapted to be engaged by the yoke or arm 40, for the purpose of moving said bar to operate the switch; and referring to Fig. 10, said yoke or arm 40 has an inclined end portion adapted to engage a pin 33 on the toggle lever-mechanism of the switch. Hence said yoke or arm is selected as the member of the operating-device which is employed to operate the switch-controller or the switch. The movement of said worm-wheel and yoke or arm to close the circuit 25, of the switch, requires a prolonged period of time, and such movement is controlled by means responsive to the overload current, so that the operating-device is controlled by the overload current. As a means to move the worm-wheel and the yoke or arm an electric-motor is employed.

48 represents the armature of the motor, which is supported in suitable bearings, and one end of the shaft of said armature is extended as at 49 and is threaded to form a worm. The worm-wheel 43 is supported by a movable member beneath said worm and is movable into and out of engagement therewith, but is normally out of engagement. Said worm serves as the means to drive the worm-wheel, and therefore constitutes the actuator of the operating-device.

The engagement of the operating-device with its actuator is controlled by the same current which operates the motor, and, herein the worm-wheel 43 is supported by an extension of the lower part of the field-frame of the motor, which is made movable with respect to the upper part thereof, whereby the worm-wheel is moved into and out of engagement with its actuator. The field-frame of the motor is or may be made in two parts, or may have a movable part in connection with it, and, as here shown, said frame is divided on a horizontal line, 50 representing the upper part and 51 the lower part; and said parts are hingedly connected together at 52, so that the lower part is movable toward and from the upper part, and the upper part is held stationary, being herein connected to a support 53. With the exception of making the field-frame in two parts it may be constructed, generally speaking, in any well-known or suitable manner to support the field-coils. Movement of the lower part 51 in a direction away from the upper part is limited by an adjustable yielding stop comprising, as shown in Fig. 1, a pin 55, extended through an ear 56, arranged thereon, which engages a spring 57, resting against a fixed abutment 58, which may be a downward extension of the upper part. The lower end of the ear 56 has a hole through it for a bar 60, which is horizontally arranged and secured to the extension 58, and which projects through said hole for a considerable distance, and a spring is arranged on said bar between the ear 56 and a nut 61, adjustably arranged on the bar, which exerts its pressure upon the ear in a direction to move the lower part of the frame downward. Upward movement of the frame acts to compress said spring, so that such movement is resisted by the spring, and by adjustment of the spring a greater or less force will be required to lift the frame. The bar 60 may be calibrated, if desired, to indicate in amperes the force required to lift the frame by the magnetic influence due to the current traversing the field-coils of the motor and causing the motor-frame to act as magnet. Thus the spring 59, not only acts as a rectractile spring to assist gravity in moving the part 51 away from the part 50, but also may be employed to determine the amount of energy required to lift it, and in this respect serves as an adjusting-device for the motor, whereby it may be caused to move the operating-device into engagement with its actuator only upon an overload of a given value or in excess of such value.

When the lower part of the field-frame is in its lowermost position, being removed from or remote from the upper part, as represented in Fig. 3, said worm-wheel is removed from engagement with the worm, and when said lower part of the field-frame is in its uppermost position, as represented in Fig. 1, said worm-wheel is in engagement with the worm.

The motor is or may be arranged in a transformer circuit 70, see Fig. 8, in connection with the secondary-coil 71 of a transformer, the primary-coil 72 of said transformer being arranged in the circuit 20, so that the motor is operated by the current from said circuit through the transformer. As represented in Fig. 8 said motor is normally short-circuited by a switch or circuit-closer, the fixed members 73 of which are engaged by a plate 74, connected with the armature of a solenoid 75, which is included in the transformer-circuit 70, so as to be energized by a current from the circuit 20 through the transformer. Said solenoid 75 serves as, and constitutes the overload relay, and is adjusted to be operated by the overload current through the transformer. It may or may not be employed, and in Fig. 12 it will be observed that the motor is connected directly in the transformer circuit, said overload relay being omitted. When the overload relay attracts its armature the circuit-closer 73, 74, will be operated to open the short-circuit of the motor so that the motor will be operated by the overload current through the transformer; or in case said overload relay is omitted the motor when influenced strongly enough by the current will start. In either case when the magnetic circuit is sufficiently strong the lower part of the field-frame will be attracted toward the upper part thereof, and the operating-device for the switch-controller will be moved into engagement with its actuator, and will be driven by said actuator, and the movable member 40 of the operating-device will be moved rotarily into engagement with the circuit-closing member 27 and will move said member 27 into engagement with the circuit-closing member 26, and thus close the switch-circuit, so that the switch will be operated and the line circuit open, whereupon the current ceases and the motor comes to rest, the lower part of the field-frame returns to its normal position, the operating-device is moved out of engagement with its actuator, and the movable member 40 of the operating-device is moved out of engagement with the member 27, permitting said member 27 to disengage the member 26, and open the switch-circuit, and as the parts thus assume their normal positions said movable member 40, and worm-wheel to which it is attached will be returned to normal position, moving counter-clockwise by gravity incident to the weight of the yoke or arm. Assuming the overload current passes over the circuit for a short period of time and then ceases, and such period of time is insufficient to drive the operating-device far enough to cause its yoke or arm 40 to engage the member 27, then, as soon as said overload current ceases, the overload relay will return to normal and all the remaining parts will also return to normal automatically.

The motor has the general characteristics of a series motor, whereby the speed of its armature is variable according to the strength or value of the current, and herein said motor is constructed and arranged in such manner that its magnetic circuit and windings are so proportioned that an overload in excess of approximately three times the full load of the circuit will saturate the same to cause the motor-armature to attain its maximum speed. A light overload, meaning an overload less than approximately three times the full load of the current, will cause the motor-armature to rotate at a slower speed, that is to say, a speed proportionate to the strength or current value of the overload, but a heavy overload, meaning an overload greater than approximately three times the full load of the circuit, will cause the motor-armature to rotate at its maximum speed regardless of the strength of the overload.

The term motor herein employed is intended to include any form of device in which motive power is derived from electric currents by means of electro-magnetic action, and such a device when constructed and arranged to exert a variable force proportionate to the current value of the overload up to its point of saturation and to exert a constant or definite force on overloads of higher current values, comes within the spirit and scope of my invention, but it will be understood that said motor however constructed to accomplish the aforesaid result is employed in connection with a time element, so that an appreciable length of time is always consumed in operating the switch. This motor or any equivalent form of motor having the same characteristics, when used to operate switch-operating mechanism arranged to require a prolonged period of time to operate the switch, results in a prolonged period of time being required on all overloads, but the length of said period of time is variable according to the current value of the overload up to a predetermined current value and is constant on all overloads of higher current values. This result is of the greatest importance for it enables a set of time-limit controlling-devices to be selective regardless of the strength of the overload.

By referring to Fig. 11, a representation of a chart is shown having chart-lines which indicate the action of four time-limit controlling-devices having different settings for a five ampere overload through the transformer. They are set to operate respectively in four and three tenths, eleven, thirteen and eighteen seconds, and will operate selectively in regular order on the given overload. In case of an excessive overload, say twenty ampere overload, the chart-line shows that the first named device will operate in about one-half second, the second in about one second, the third in about one and three-fourths seconds and fourth in about two and two-tenths seconds. The important feature to be noted, however, is that the inverse curve of each chart-line terminates in a direct or straight line, and the several straight lines of the several devices are in parallel, and will so continue, instead of intersecting, so that their selective action is insured upon the occurrence of any overload.

For the purpose of retarding the speed of the motor-shaft to more effectively control the speed of the operating-device when said device is in engagement with its actuator, and is being operated by the overload, a disk 80 may be secured to the motor-shaft, see Fig. 6, which is composed of copper or equivalent material, and a magnet 81 is arranged adjacent said disk so that the disk moves in the field of said magnet to generate a current which dissipates itself in heat and acts to load down the motor. Said electric retarding means may or may not be employed. A brake is also here shown for the shaft of the motor, which is designed to hold said shaft at rest until the motor is influenced by a current at least as powerful as the overload which it is designed and intended shall operate the device, and referring to Figs. 1 and 3, said brake comprises a pulley 85 secured to the motor-shaft, and a brake-band 86 engaging said pulley, the ends of which are connected to the movable part of the field-frame, as for instance, to projections 87 on said movable part. Normally, the movable part of the field-frame is held in its lowermost position by the spring 59 and said brake-band 96 is held in firm engagement with the pulley 85, and will act to hold the motor-shaft at rest by the friction of the band. The spring 59 is adjusted so that the movable member of the field-frame will not be attracted toward the stationary part on a less powerful overload than is designed and intended to start and operate the motor, but upon the occurrence of a sufficient overload said movable part will be attracted toward the stationary part overcoming the force of said spring 59, and the brake will be moved to release its firm engagement with the pulley so that the motor is free to operate. The operations of lifting the movable part of the field-frame and of starting the motor are, of course, practically simultaneous upon the occurrence of an overload which is at least as great as it is designed and intended shall operate the motor. The brake is employed particularly in case the motor is arranged directly in the transformer circuit, the overload relay being omitted, as shown in Fig. 12, as in such case it prevents the motor from starting until influenced by a current sufficiently strong to overcome the force of the spring 59.

The motor here shown, having the capability of causing the switch-operating-device or circuit-closing member to engage its rotary actuator, and also of rotating said actuator and switch-operating-device in engagement with it, is of advantage as an electro-responsive means adapted to be controlled by the overload and to in turn operate the switch-operating means, even though it does not possess the capabilities heretofore recited, viz:—the capability of operating at a variable speed on a light overload up to its point of saturation and at a constant speed on overloads of higher current values; and further, a motor having the last named capabilities need not necessarily have the first named capabilities, hence I lay claim thereto separately, but a motor having all the capabilities is the preferred embodiment of my invention.

Figure 13:
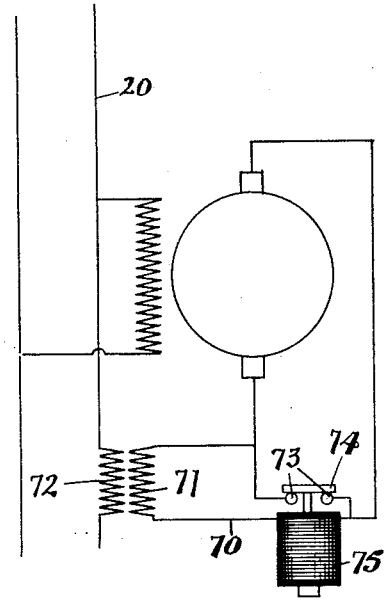

Referring to Fig. 13, a diagram is shown of a transformer, a transformer circuit and motor, the motor field being connected with the circuit and operated by a constant potential, but the current in the armature varies according to the strength of the overload and the magnetic circuit and windings of the armature are so arranged that the speed of the armature varies up to the point of saturation where it attains its maximum speed, and for higher current values the speed does not increase. This enables the results heretofore described to be attained.

Figure 14:
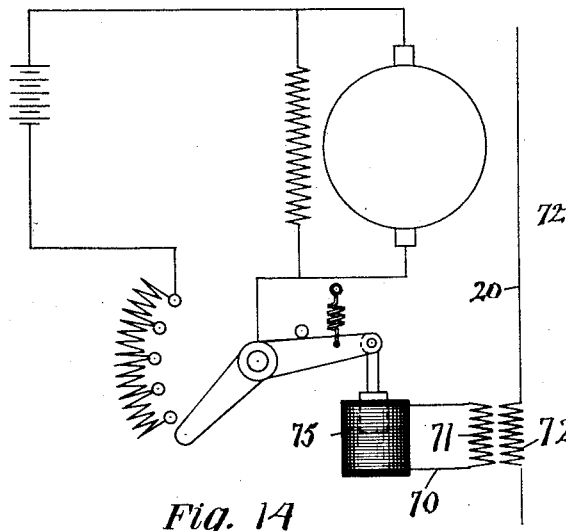

Referring to Fig. 14 a diagram is shown of a transformer and transformer circuit having connected therein an overload relay and a motor arranged in a battery circuit which is controlled by the overload relay through a variable resistance. In this instance the speed of the motor varies according to the amount of resistance which is included and the amount of resistance is controlled by the solenoid 75 arranged in the series transformer circuit 70 until all of the resistance is cut out at approximately three times the full load of the circuit, and at this point the motor attains its maximum speed, and on higher current values will run at the same speed.

Figure 15:
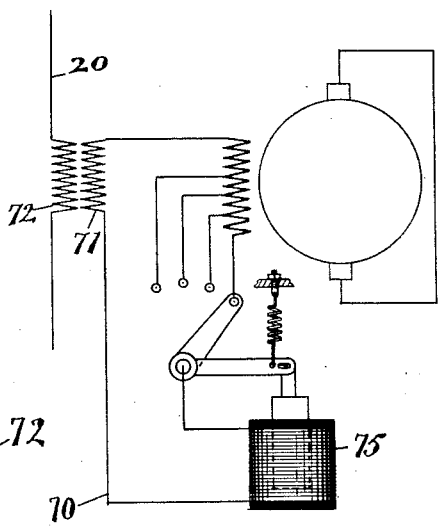

Referring to Fig. 15, a modification similar to Fig. 14 is shown, wherein the overload relay controls the field windings of the motor instead of cutting resistances in and out. In said Fig. 15 the motor represented is a repulsion motor instead of a direct current motor.

Figures 16, 17:
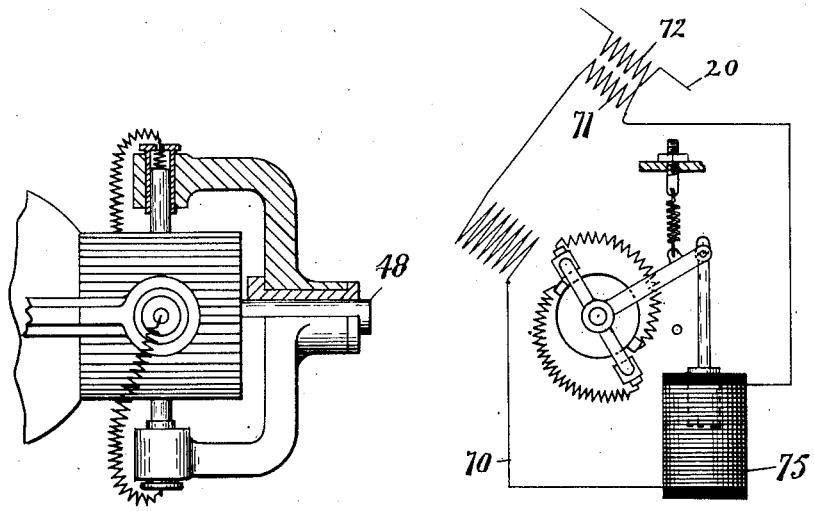

Referring to Figs. 16 and 17 a repulsion motor is shown in which the speed of the motor is dependent upon the position of the brushes on the commutator, and the brushes of the motor are arranged to be controlled by the overload relay, thus producing the same effect, so far as the speed of the motor is concerned as is produced in Fig. 14.

Figure 18:
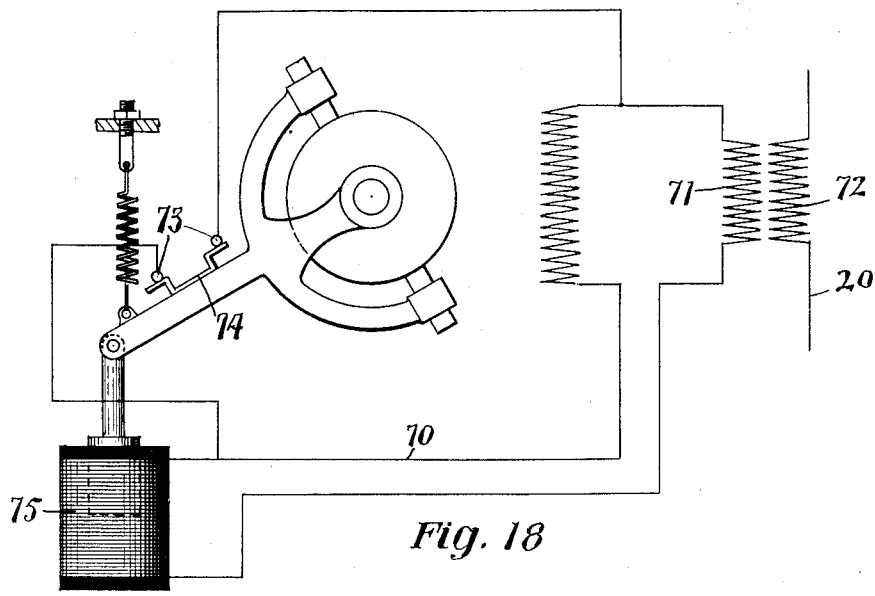

Referring to Fig. 18 the motor is the same as represented in Fig. 17, the brushes of the motor are short-circuited but movable into different positions according to the strength of the overload. In this instance normally the field coils are short-circuited and when said short-circuit is opened the field coils are cut in and the brushes are moved relatively to their coöperating member. The same results are herein attained as in Figs. 16 and 17.

I claim:—

1. A selective time-limit controlling-device for electric-switches having an operating-device requiring a prolonged period of time to operate the switch, and means responsive to an overload current to actuate said operating-device, which means consumes varying periods of time in causing the operating-device to operate the switch according to the current value of the overload up to a predetermined current value, and constant periods of time regardless of the current value of the overload on overloads of higher current values, substantially as described.

2. A selective time-limit controlling-device for electric-switches having an operating-device requiring a prolonged period of time to operate the switch, and means responsive to an overload current to actuate said operating-devices, which means exerts a force proportionate to the current value of the overload up to a predetermined current value, and exerts a constant force regardless of the current value of the overload on loads of higher current values, substantially as described.

3. A selective time-limit controlling-device for electric-switches having an operating-device requiring a prolonged period of time to operate the switch, and means responsive to an overload current to actuate said operating-device at a variable speed according to the current value of the overload, up to a predetermined current value, and at a definite speed, regardless of the current value of the overload on overloads of higher current values, substantially as described.

4. A selective time-limit controlling-device for electric-switches, comprising switch-operating means requiring a prolonged period of time to operate the switch, and an electro-magnetic device responsive to an overload current to actuate said switch-operating means, said electro-magnetic device consuming periods of time of different length in causing the switch-operating means to operate the switch according to the current value of the overload up to a predetermined current value, and periods of time of the same length on overload of higher current values, substantially as described.

5. A selective time-limit controlling-device for electric-switches comprising switch-operating means requiring a prolonged period of time to operate the switch, and an electro-magnetic device responsive to an overload current to actuate said switch operating-means which exerts a force proportionate to the current value of an overload up to its point of saturation, and exerts its maximum force on overloads of higher current values, substantially as described.

6. A selective time-limit controlling-device for electric-switches comprising switch-operating means requiring a prolonged period of time to operate the switch, an electro-magnetic device responsive to an overload current to actuate said switch operating-means at a variable speed according to the current value of the overload up to its point of saturation, where its maximum speed is attained, and at its maximum speed on overloads of higher current value, substantially as described.

7. A selective time-limit controlling-device for electric-switches comprising operating-means for the switch, a movable element to control said operating-means, a coil for said movable element having its magnetic-circuit and windings so proportioned that upon the occurence of an overload the force exerted by the movable element is proportionate to the current value of the overload up to the point of saturation, and above said point is constant regardless of the current value of the overload, substantially as described.

8. A selective time-limit controlling-device for electric-switches comprising operating-means for the switch, a movable element to control said operating-means, a coil for said movable element having its magnetic-circuit and windings so proportioned that upon the occurrence of an overload which is less than approximately three times the full load of the circuit which is controlled by the switch, the force exerted by the movable element is variable according to the strength of the overload, and upon the occurrence of a heavier overload the force exerted by the movable element is constant regardless of the strength of the overload, substantially as described.

9. A selective time-limit controlling-device for electric-switches consisting of a self-restoring operating-device requiring a prolonged period of time to operate the switch, an electric-motor to actuate said operating-device, which is variably responsive to an overload current according to the value thereof up to a predetermined value, and is definitely responsive to overloads of higher current values, said operating-device being movable into and out of coöperative relation with its actuating-means by means controlled by the overload current, resuming its normal position when the overload current ceases, substantially as described.

10. A selective time-limit controlling-device for electric-switches consisting of a controller for the switch, an operating-device for said controller requiring a prolonged period of time to operate the controller, a rotatable actuator into and out of engagement with which said operating-device is movable, an electric-motor responsive to an overload current to rotate said actuator at a variable speed according to the value of the overload up to a predetermined value, and at a definite speed in response to overloads of higher values, and means responsive to an overload to move said operating-device into engagement with its actuator, which permits of its return to normal when the overload ceases, substantially as described.

11. In a selective time-limit device for electric-switches, the combination of a circuit-closing member, means for imparting a speed of movement forward to said member upon the creation of an overload, which speed varies according to the current value of the overload up to a predetermined current value and remains constant on higher current values, and means to return said circuit-closing member to its original position when the overload falls below a predetermined current value, substantially as described.

12. A time-limit controlling-device for electric-switches consisting of an operating-device requiring a prolonged period of time to operate the switch, an actuator therefor, an electric-motor for driving said actuator responsive to an overload current, and movable means supporting said operating-device, whereby said device is movable into and out of engagement with its actuator, said movable means being arranged in the magnetic-field of the motor and adapted to be moved by the attractive influence of said field, substantially as described.

13. A time-limit controlling-device for electric-switches consisting of an operating-device requiring a prolonged period of time to operate the switch, an actuator therefor, an electric-motor for driving said actuator responsive to an overload current, the field-frame of said motor being composed of two parts, one of which is movable with relation to the other by the magnetic influence due to the current traversing the field-coils, said movable part bearing the operating-device and permitting movement of said device into and out of engagement with its actuator, substantially as described.

14. A time-limit controlling-device for electric-switches consisting of a switch-controller, an operating-device requiring a prolonged period of time to cause the switch-controller to operate the switch, an actuator into and out of engagement with which said operating-device is movable, an electric-motor for driving said actuator which is responsive to an overload current, and movable means supporting said operating-device and permitting movement of said device toward and from its actuator; said means being arranged in the magnetic-field of the motor and adapted to be moved by the attractive influence of said field, substantially as described.

15. A time-limit controlling-device for electric-switches, consisting of a switch-controller, an operating-device for said controller requiring a prolonged period of time to cause said controller to operate the switch, an actuator into and out of engagement with which said operating-device is movable, an electric-motor for driving said actuator which is responsive to an overload current, the field-frame of said motor being composed of two parts, one of which is movable with relation to the other by the magnetic influence due to the current passing through the field-coils, said movable part bearing said operating-device, substantially as described.

16. In a time-limit controlling-device for electric-switches consisting of an operating-device requiring a prolonged period of time to operate the switch, an actuator responsive to an overload current into and out of engagement with which said operating-device is movable, means controlled by the overload current to move said operating-device into engagement with its actuator permitting disengagement thereof when the overload ceases, and an adjusting-device for said means whereby it is permitted to operate only on an overload of at least a given strength, substantially as described.

17. A time-limit controlling-device for electric-switches consisting of an operating-device requiring a prolonged period of time to operate the switch, an actuator therefor, an electric-motor for driving said actuator responsive to an overload current, and movable means supporting said operating-device, whereby said device is movable into and out of engagement with its actuator, said movable means being arranged in the magnetic-field of the motor and adapted to be moved by the attractive influence of said field, and an adjusting-device for said movable means whereby it is permitted to operate only on an overload of at least a given strength, substantially as described.

18. A time-limit controlling-device for electric-switches consisting of an operating-device for the switch, an actuator into and out of engagement with which said operating-device is movable, an electric-motor for driving said actuator which is responsive to an overload current, means to move said operating-device into engagement with its actuator which is responsive to an overload of at least a given strength which permits return of said operating-device to normal when the overload ceases, substantially as described.

19. A time-limit controlling-device for electric-switches consisting of an operating-device for the switch, an actuator into and out of engagement with which said operating-device is movable, an electric-motor for driving said actuator which is responsive to an overload current, means to move said operating-device into engagement with its actuator which is responsive to an overload current which permits return of said means to normal when the overload ceases, and an adjusting-device for said means which permits it to operate only upon an overload of at least a given strength, substantially as described.

20. A time-limit controlling-device for electric-switches consisting of an operating-device for the switch, an actuator therefor, an electric-motor for driving said actuator which is responsive to an overload current, movable means supporting said operating-device whereby said device is movable into and out of engagement with its actuator, said movable means being arranged in the magnetic-field of the motor and adapted to be moved by the attractive influence of said field, a brake for holding the motor at rest, and means to move said brake to release the motor which is connected with said movable means, substantially as described.

21. A time-limit controlling-device for electric-switches consisting of an operating-device for the switch, an actuator therefor, an electric-motor for driving said actuator which is responsive to an overload current, movable means supporting said operating-device whereby said device is movable into and out of engagement with its actuator, said movable means being arranged in the magnetic field of the motor and adapted to be moved by the attractive influence of said field, an adjusting-device for said movable means whereby it is permitted to operate only on an overload of at least a given strength, a brake for holding the motor at rest, and means to move said brake to release the motor, which is conected with said movable means, substantially as described.

In testimony whereof, I have signed my name to this specification, in the presence of two subscribing witnesses.

GEORGE A. BURNHAM.

Witnesses:
B. J. NOYES,
H. B. DAVIS.